(12) United States Patent
Kuwahara

(10) Patent No.: US 11,931,924 B2
(45) Date of Patent: Mar. 19, 2024

(54) METHOD FOR PRODUCING FLEXIBLE MOLD, FLEXIBLE MOLD SUBSTRATE AND METHOD FOR PRODUCING OPTICAL COMPONENT

(71) Applicant: Nippon Electric Glass Co., Ltd., Shiga (JP)

(72) Inventor: Koji Kuwahara, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 344 days.

(21) Appl. No.: 17/277,380

(22) PCT Filed: Aug. 20, 2019

(86) PCT No.: PCT/JP2019/032480
§ 371 (c)(1),
(2) Date: Mar. 18, 2021

(87) PCT Pub. No.: WO2020/059389
PCT Pub. Date: Mar. 26, 2020

(65) Prior Publication Data
US 2021/0354336 A1    Nov. 18, 2021

(30) Foreign Application Priority Data
Sep. 21, 2018  (JP) ................. 2018-177820

(51) Int. Cl.
*B29C 33/38*    (2006.01)
*B29C 33/42*    (2006.01)
(Continued)

(52) U.S. Cl.
CPC ........ *B29C 33/3878* (2013.01); *B29C 33/424* (2013.01); *B29C 59/04* (2013.01);
(Continued)

(58) Field of Classification Search
CPC ...... B29L 2011/0016; B29L 2011/0058; B29L 2011/0066; B29C 2035/0827;
(Continued)

(56) References Cited

U.S. PATENT DOCUMENTS

2010/0276066 A1  11/2010 Kondo
2018/0321584 A1  11/2018 Ishikawa et al.

FOREIGN PATENT DOCUMENTS

EP    3 351 364    7/2018
JP    2009-66962   4/2009
(Continued)

OTHER PUBLICATIONS

International Search Report dated Oct. 15, 2019 in International (PCT) Application No. PCT/JP2019/032480.
(Continued)

*Primary Examiner* — Emmanuel S Luk
*Assistant Examiner* — Victoria Bartlett
(74) *Attorney, Agent, or Firm* — WENDEROTH, LIND & PONACK, L.L.P.

(57) ABSTRACT

Provided is a base (1) for a flexible mold that is to be wound in an endless manner, and the base includes: an intermediate sheet (2); and first and second resin sheets (3, 5) bonded to both main surfaces of the intermediate sheet (2) through intermediation of first and second bonding layers (4, 6), respectively. The intermediate sheet (2) includes: first and second spacer sheets (7, 8), which are each made of a resin, and are arranged at one end portion and another end portion in a winding direction, respectively; and a glass sheet (9) arranged between those spacer sheets (7, 8).

23 Claims, 5 Drawing Sheets

(51) Int. Cl.
*B29C 59/04* (2006.01)
*B29L 11/00* (2006.01)

(52) U.S. Cl.
CPC .......... *B29L 2011/0016* (2013.01); *B29L 2011/0058* (2013.01); *B29L 2011/0066* (2013.01)

(58) Field of Classification Search
CPC . B29C 59/04; B29C 33/3842; B29C 33/3878; B29C 33/424; B29C 43/04; B29C 2043/043; B29C 2043/466; G02B 1/118; G02B 5/18; B29B 43/08
See application file for complete search history.

(56) References Cited

FOREIGN PATENT DOCUMENTS

| | | | |
|---|---|---|---|
| JP | 2014014996 A | * | 1/2014 |
| JP | 2017-1333 | | 1/2017 |
| KR | 101808522 B1 | * | 12/2017 |
| TW | 200948604 | | 12/2009 |
| WO | 2015/037601 | | 3/2015 |
| WO | 2016/148118 | | 9/2016 |
| WO | 2017/047635 | | 3/2017 |
| WO | 2018/008326 | | 1/2018 |

OTHER PUBLICATIONS

Office Action dated Feb. 18, 2023 in corresponding Taiwanese Patent Application No. 108131587, with English-language translation of Search Report.
International Preliminary Report on Patentability and Written Opinion of the International Searching Authority dated Mar. 23, 2021 in International (PCT) Patent Application No. PCT/JP2019/032480.

* cited by examiner

METHOD FOR PRODUCING FLEXIBLE MOLD, FLEXIBLE MOLD SUBSTRATE AND METHOD FOR PRODUCING OPTICAL COMPONENT

TECHNICAL FIELD

The present invention relates to a manufacturing method for a flexible mold, a base for a flexible mold, and a manufacturing method for an optical component using a flexible mold.

BACKGROUND ART

For example, in a manufacturing process for an optical device, a flexible mold having such flexibility that enables bending deformation is used in some cases. As one of methods of manufacturing a flexible mold, there is given an imprint method. In the imprint method, a molding material is sandwiched between a master mold and a base so that an uneven layer obtained by transferring an uneven pattern of the master mold to the molding material is formed on the base. As a result, a flexible mold including the base and the uneven layer is obtained.

As a base for a flexible mold, for example, as disclosed in Patent Literature 1, there is given a base that includes a glass sheet to reduce a change in dimension of a flexible mold due to a change in temperature. Further, in Patent Literature 1, there is disclosed a base having a resin layer that is formed on a main surface of a glass sheet on one side because, for example, formation of cracks is liable to occur when the base is formed only of the glass sheet.

CITATION LIST

Patent Literature 1: WO 2015/037601 A1

SUMMARY OF INVENTION

Technical Problem

The base for a flexible mold as disclosed in Patent Literature 1 as the resin layer formed only on the main surface of the glass sheet on one side. Thus, there is a fear in that the glass sheet is broken when another member comes into contact with another main surface side of the glass sheet.

Further, in some cases, the flexible mold is wound in an endless manner, for example, in a form of an endless belt or a roll, and is used in such form. When such flexible mold is formed with use of the base as disclosed in Patent Literature 1, under the state in which the flexible mold is wound in the endless manner, one end surface and another end surface of the glass sheet in a winding direction come into contact with each other. Consequently, there is a fear in that, in a manufacturing process for the flexible mold or a manufacturing process for a product using the flexible mold, the glass sheet is broken with the end surfaces of the glass sheet in the winding direction as a starting point of the breakage.

The above-mentioned breakage of the glass sheet of the base may cause not only the breakage of the flexible mold but also contamination of a surrounding environment due to formation of broken pieces of glass (including glass powder) in the process of manufacturing the flexible mold or a process of manufacturing an optical component (for example, optical device) using the flexible mold.

The present invention has an object to reliably reduce breakage of a glass sheet in a process of manufacturing a flexible mold and/or a process of manufacturing an optical component using the flexible mold having been manufactured.

Solution to Problem

According to one embodiment of the present invention, which has been devised in order to solve the above-mentioned problem, there is provided a manufacturing method for a flexible mold that is to be wound in an endless manner, the flexible mold comprising: a base; and an uneven layer formed on the base, the manufacturing method comprising: a transfer step of sandwiching a molding material between the base and a master mold so that the uneven layer obtained by transferring an uneven pattern of the master mold to the molding material is formed on the base, wherein the base comprises: an intermediate sheet; and resin sheets bonded to both main surfaces of the intermediate sheet through intermediation of bonding layers, respectively, and wherein the intermediate sheet comprises: spacer sheets, which are each made of a resin, and are arranged at one end portion and another end portion in a winding direction, respectively; and a glass sheet arranged between both the spacer sheets. With such configuration, both the main surfaces of the intermediate sheet comprising the glass sheet are protected by the resin sheets. Thus, the glass sheet is less liable to be broken. Further, in case of breakage of the glass sheet, broken pieces of glass stay between the resin sheets and are less liable to scatter to the surrounding. Further, the spacer sheets each made of a resin are arranged at the one end portion and the another end portion of the intermediate sheet comprising the glass sheet in the winding direction, respectively. Thus, under the state in which the flexible mold is wound in the endless manner, both the end surfaces of the glass sheet in the winding direction are prevented from coming into direct contact with each other. Consequently, breakage of the glass sheet due to the contact between both the end surfaces of the glass sheet in the winding direction can be prevented.

Here, when the spacer sheets are arranged in the manner described above, as compared to the case in which the spacer sheets are not arranged, the thickness of the intermediate sheet is less liable to vary at the portion corresponding to the glass sheet and the portions corresponding to the spacer sheets. Thus, formation of a step between the resin sheets which are located on an outer side when the flexible mold having been manufactured is wound in the endless manner can be prevented. Consequently, the flexible mold wound in the endless manner has an advantage in that the recess/projection pattern can be transferred to a product with high accuracy or in that ease of operation in the transfer step is improved.

In the above-mentioned configuration, it is preferred that end surfaces of the glass sheet in a width direction orthogonal to the winding direction be covered by the bonding layers. With such configuration, the end surfaces of the glass sheet in the width direction are protected by the bonding layers. Thus, the end surfaces of the glass sheet in the width direction are less liable to be broken. Further, even in case of breakage, broken pieces of glass are less liable to scatter to the surrounding.

In the above-mentioned configuration, it is preferred that the resin sheets protrude from the bonding layers in the width direction orthogonal to the winding direction. With such configuration, the bonding layers do not protrude toward the outer side of the resin sheets in the width direction. Thus, contamination of a surrounding environment with an adhesive can be prevented.

In the above-mentioned configuration, it is preferred that end surfaces of the spacer sheets and end surfaces of the glass sheet opposed to each other in the winding direction be apart from each other. With such configuration, the end surfaces of the glass sheet in the winding direction are less liable to come into direct contact with the spacer sheets. Thus, the end surfaces of the glass sheet in the winding direction are less liable to be broken.

In the above-mentioned configuration, it is preferred that the resin sheets which are to be located on an inner side when the flexible mold is wound in the endless manner have low viscosity. With such configuration, when it is required to replace the flexible mold wound in the endless manner, the flexible mold can easily be removed from a main body portion (base portion) of, for example, a roll or an endless belt.

In the above-mentioned configuration, it is preferred that the base comprise a protective film that is removably laminated on at least one of main surfaces of the base. With such configuration, damage and adhesion of dirt on the surface of the base can be prevented. Thus, for example, when the protective film is laminated on the surface of the base on which the uneven layer is to be formed, and the protective film is removed immediately before the uneven layer is formed, the uneven layer can be formed with high accuracy.

According to one embodiment of the present invention, which has been devised in order to solve the above-mentioned problem, there is provided a base for a flexible mold that is to be wound in an endless manner, the base comprising: an intermediate sheet; and resin sheets bonded to both main surfaces of the intermediate sheet through intermediation of bonding layers, respectively, wherein the intermediate sheet comprises: spacer sheets, which are each made of a resin, and are arranged at one end portion and another end portion in a winding direction, respectively; and a glass sheet arranged between both the spacer sheets. When the flexible mold is manufactured with use of the base having such configuration, actions and effects which are similar to those obtained with the corresponding configuration described above can be obtained.

According to one embodiment of the present invention, which has been devised in order to solve the above-mentioned problem, there is provided a manufacturing method for an optical component, the optical component comprising: a substrate; and an uneven layer formed on the substrate, the manufacturing method comprising: a transfer step of sandwiching a molding material between the substrate and a flexible mold that is wound in an endless manner so that the uneven layer obtained by transferring an uneven pattern of the flexible mold to the molding material is formed on the substrate, wherein the flexible mold comprises: an intermediate sheet; and resin sheets bonded to both main surfaces of the intermediate sheet through intermediation of bonding layers, respectively, and wherein the intermediate sheet comprises: spacer sheets, which are each made of a resin, and are arranged at one end portion and another end portion in a winding direction, respectively; and a glass sheet arranged between both the spacer sheets. With such configuration, in the flexible mold, both the main surfaces of the intermediate sheet comprising the glass sheet are protected by the resin sheets. Thus, the glass sheet is less liable to be broken. Further, in case of breakage of the glass sheet, broken pieces of glass stay between the resin sheets and are less liable to scatter to the surrounding. Further, the spacer sheets each made of a resin are arranged at the one end portion and the another end portion of the intermediate sheet comprising the glass sheet in the winding direction, respectively. Thus, under the state in which the flexible mold is wound in the endless manner, both the end surfaces of the glass sheet in the winding direction are prevented from coming into direct contact with each other. Consequently, breakage of the glass sheet due to the contact between both the end surfaces of the glass sheet in the winding direction can be prevented.

Advantageous Effects of Invention

According to the present invention, breakage of a glass film can be reliably reduced in the process of manufacturing a flexible mold and/or the process of manufacturing an optical component using the flexible mold having been manufactured.

DESCRIPTION OF EMBODIMENTS

Figure 1:
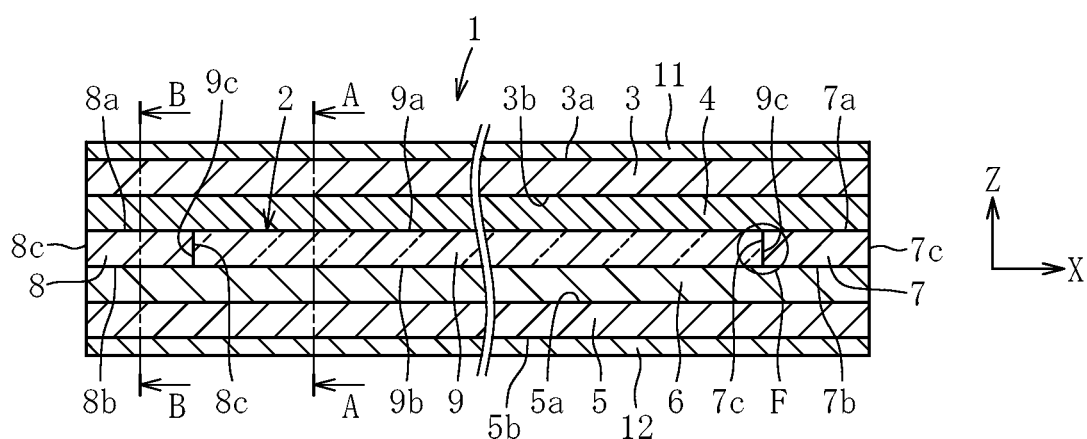
FIG. 1 is a sectional view for illustrating a base for a flexible mold according to an embodiment of the present invention.

An embodiment of the present invention is described below with reference to the accompanying drawings. The items X, Y, and Z in the drawings form an orthogonal coordinate system. The X direction and the Y direction correspond to horizontal directions. The X direction corresponds to a winding direction in a state of extending on a horizontal plane. The Y direction corresponds to a width direction. The Z direction corresponds to a vertical direction.

Figure 2:
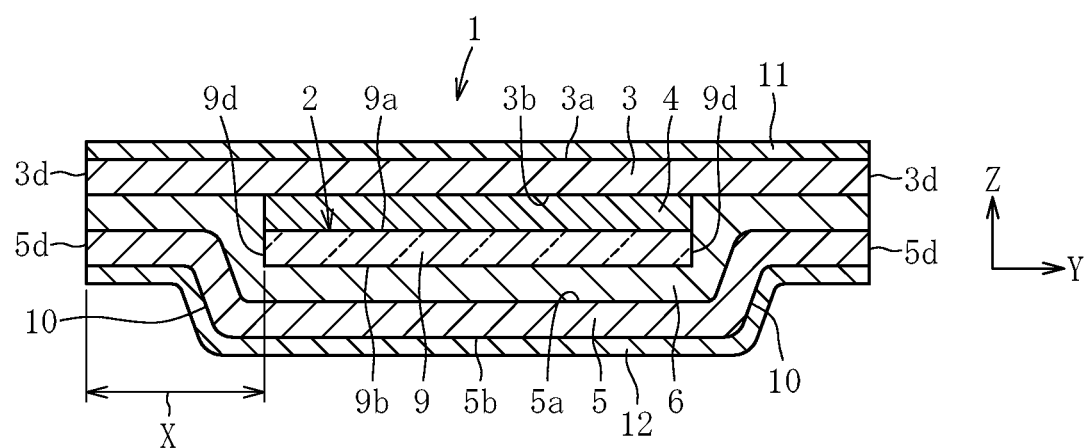
FIG. 2 is a sectional view taken along the line A-A of FIG. 1.
Figure 3:
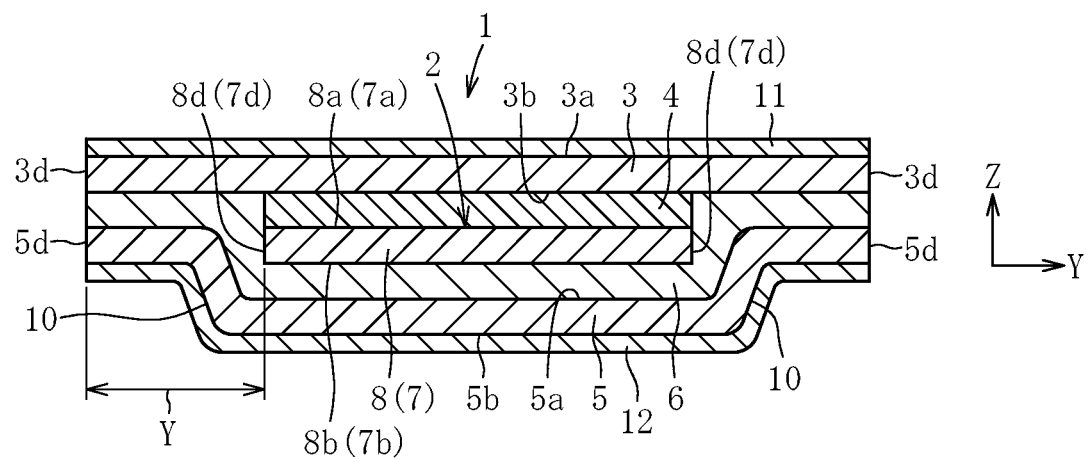
FIG. 3 is a sectional view taken along the line B-B of FIG. 1.

As illustrated in FIG. 1 to FIG. 3, a base 1 for a flexible mold according to this embodiment comprises an intermediate sheet 2, a first resin sheet 3, a first bonding layer 4, a second resin sheet 5, and a second bonding layer 6. The first bonding layer 4 is configured to bond a first main surface of the intermediate sheet 2 and a second main surface 3b of the first resin sheet 3 to each other. The second bonding layer 6 is configured to bond a second main surface of the intermediate sheet 2 and a first main surface 5a of the second resin sheet 5. In this embodiment, the base 1 has a winding-direction dimension larger than a width-direction dimension, and thus is elongated in the winding direction. Further, a width-direction dimension of the first bonding layer 4 is smaller than a width-direction dimension of the first resin sheet 3, and is approximately equal to a width-direction dimension of the intermediate sheet 2. A width-direction dimension of the second bonding layer 6 is approximately equal to a width-direction dimension of the second resin sheet 5, and is larger than the width-direction dimension of the intermediate sheet 2.

Here, the term "flexible" means a state of having such flexibility that enables bending deformation. Thus, the base 1 has the flexibility that enables bending deformation, and is used also in a state of being bent in an endless manner, for example, in a form of a roll or an endless belt (see FIG. 6 described later). Under the state in which the base 1 is bent in the endless manner, the first main surface side of each of the sheets forming the base 1 corresponds to an outer side, and the second main surface side corresponds to an inner side.

The intermediate sheet 2 comprises a first spacer sheet 7, a second spacer sheet 8, and a glass sheet 9. The first spacer sheet 7 is arranged at one end portion in the winding direction. The second spacer sheet 8 is arranged at another end portion in the winding direction. The glass sheet 9 is arranged between the spacer sheets 7 and 8. The spacer sheets 7 and 8 are each made of a resin.

A first main surface 7a of the first spacer sheet 7, a first main surface 8a of the second spacer sheet 8, and a first main surface 9a of the glass sheet 9 are bonded to the second main surface 3b of the first resin sheet 3 through intermediation of the first bonding layer 4. Similarly, a second main surface 7b of the first spacer sheet 7, a second main surface 8b of the second spacer sheet 8, and a second main surface 9b of the glass sheet 9 are bonded to the first main surface 5a of the second resin sheet 5 through intermediation of the second bonding layer 6.

With such configuration, both the main surfaces 9a and 9b of the glass sheet 9 are protected by the resin sheets 3 and 5. Thus, the glass sheet 9 is less liable to be broken. Further, in case of breakage, broken pieces of glass are less liable to scatter to the surrounding.

Further, the resin sheets 3 and 5 are bonded to both the main surfaces 9a and 9b of the glass sheet 9. Thus, even when the base 1 is heated, for example, by a heat treatment, stresses which act on both the main surfaces 9a and 9b of the glass sheet 9 due to, for example, expansion of the resin sheets 3 and 5 are substantially the same. As a result, occurrence of such a warp that causes the base 1 to protrude on one main surface side can be suppressed.

Further, the spacer sheets 7 and 8 are arranged at the one end portion and the another end portion of the intermediate sheet 2 in the winding direction, respectively. Thus, under a state in which the base 1 is wound in the endless manner (see FIG. 6), end surfaces 9c of the glass sheet 9 in the winding direction are prevented from coming into direct contact with each other. Consequently, breakage of the glass sheet 9 due to the contact between the end surfaces 9c of the glass sheet 9 in the winding direction can be prevented.

Further, the thickness of the intermediate sheet 2 is less liable to vary at the portion corresponding to the glass sheet 9 and the portions corresponding to the spacer sheets 7 and 8. Thus, under a state in which the bending deformation does not occur in the base 1, that is, under a state in which the base 1 extends on the horizontal plane, the resin sheets 3 and 5 are flat at portions overlapping the intermediate sheet 2. Consequently, in a case in which the first resin sheet 3 that is located on the outer side when the base 1 is wound in the endless manner is rotated in the winding direction and seen in this state, formation of any step caused by a change in thickness of the intermediate sheet 2 is less liable to occur at the portions overlapping the intermediate sheet (see FIG. 6).

The glass sheet 9 has a rectangular shape in plan view. It is preferred that the glass sheet 9 have a thickness of from 10 μm to 500 μm, more preferably from 50 μm to 200 μm, still more preferably from 50 μm to 100 μm. When the glass sheet 9 is excessively thick, the flexibility is liable to be degraded, and hence there is a fear in that it becomes more difficult to cause the bending deformation of the glass sheet 9 and wind the glass sheet 9 in the endless manner. Meanwhile, when the glass sheet 9 is excessively thin, there is a fear in that the mechanical strength is degraded.

Examples of a composition of the glass sheet 9 include non-alkali glass, borosilicate glass, soda glass (soda-lime glass), high-silica glass, and other oxide-based glass containing silicon oxide as a main component. The glass sheet 9 may be made of chemically reinforced glass. In this case, aluminosilicate glass can be used. It is preferred that the glass sheet 9 have a high transmittance for ultraviolet rays (365 nm) and a low thermal expansion coefficient. Specifically, it is preferred that the glass sheet 9 be made of non-alkali glass that is used for a glass substrate for a display.

From the viewpoint of securing the high transmittance for ultraviolet rays (365 nm) and the low thermal expansion coefficient, it is preferred that the non-alkali glass contain, in terms of mass %, $SiO_2$ at 50% to 70%, $Al_2O_3$ at 12% to 25%, $B_2O_3$ at 0% to 12%, $Li_2O+Na_2O+K_2O$ (total amount of $Li_2O$, $Na_2O$, and $K_2O$) at 0% to 1% exclusive, MgO at 0% to 8%, CaO at 0% to 15%, SrO at 0% to 12%, and BaO at 0% to 15%. Further, it is more preferred that the above-mentioned non-alkali glass contain, in terms of mass %, $SiO_2$ at 50% to 70%, $Al_2O_3$ at 12% to 22% (in particular, 15% to 20%), $B_2O_3$ at 7% to 15% (in particular, 9% to 13%), $Li_2O+Na_2O+K_2O$ at 0% to 1% exclusive (in particular, 0% to 0.50%), MgO at 0% to 3%, CaO at 6% to 13% (inparticular, 7% to 12%), SrO at 0.1% to 5% (inparticular, 0.5% to 40%), and BaO at 0% to 2% (in particular, 0.1% to 1.50%).

The glass sheet 9 is formed by a publicly known forming method such as a float method or a down-draw method. Of those, it is preferred that the glass sheet 9 be formed by an overflow down-draw method. In such a manner, there is an advantage in that the surface of the glass sheet 9 is formed into a fire-polished surface not subjected to a polishing treatment, which is significantly smooth. The spacer sheets 7 and 8 each have a rectangular shape in plan view, and thicknesses thereof are substantially the same as the thickness of the glass sheet 9. Here, the term "substantially the same" includes ±10% of the thickness of the glass sheet 9. With such configuration, under the state in which the bending deformation does not occur in the base 1, the first main surfaces 7a and 8a of the spacer sheets 7 and 8 and the first main surface 9a of the glass sheet 9 are substantially in flush with each other, and the second main surfaces 7b and 8b of the spacer sheets 7 and 8 and the second main surface 9b of the glass sheet 9 are substantially in flush with each other. The width-direction dimension of each of the spacer sheets 7 and 8 is the same as or larger than the width-direction dimension of the glass sheet 9. As a matter of course, the width-direction dimension of each of the spacer sheets 7 and 8 may be smaller than the width-direction dimension of the glass sheet 9. The winding-direction dimensions of the spacer sheets 7 and 8 are smaller than the winding-direction dimension of the glass sheet 9.

A material of the spacer sheets 7 and 8 is not particularly limited as long as the material is a resin.

In this embodiment, the end surfaces 9c of the glass sheet 9 in the winding direction and the end surfaces 7c and 8c of the spacer sheets 7 and 8 in the winding direction are parallel to the width direction, and end surfaces 9d of the glass sheet 9 in the width direction and end surfaces 7d and 8d of the spacer sheets 7 and 8 in the width direction are parallel to the winding direction.

It is preferred that the resin sheets 3 and 5 each have a thickness of from 10 μm to 500 μm. However, it is more preferred that the resin sheets 3 and 5 each have a thickness of from 30 μm to 300 μm from the viewpoint of improving the flexibility and the ultraviolet-ray transmittance, still more preferably from 50 μm to 200 μm from the viewpoint of improving the ease of handling. The first resin sheet 3 and the second resin sheet 5 may have the same thickness or different thicknesses.

It is preferred that the material of the resin sheets 3 and 5 have at least one of the following properties (1) to (4). That is, it is preferred that the material of the resin sheets 3 and 5 (1) have an easy-bonding layer that is less liable to repel ink for, for example, printing (for example, COSMOSHINE (trademark) manufactured by TOYOBO Co., LTD), (2) be highly transparent for optics (total light-ray transmittance (550 nm) is from 80% to 95%), (3) be an annealed product in the case of a biaxially drawn sheet (for example, a low thermally-contractable product or an isotropic product), and (4) be a resin material that allows ultraviolet rays to transmit therethrough.

As the materials of the resin sheets 3 and 5 and the spacer sheets 7 and 8, for example, epoxy (EP), polyamide (PA), polyamide imide (PAI), polyether ether ketone (PEEK), polybenzimidazole (PBI), polyethylene terephthalate (PET), polyether sulfone (PES), cyclic polyolefin (COP), polycarbonate (PC), polyvinyl chloride (PVC), acryl (PMMA), or urethane (PU) may be adopted.

It is preferred that the resin sheets 3 and 5 have a high transmittance for ultraviolet rays (365 nm), and it is preferred that the transmittance of each of the resin sheets 3 and 5 for ultraviolet rays be from 50% to 90%. In this viewpoint, it is preferred that the material of the resin sheets 3 and 5 be polyethylene terephthalate (PET). It is preferred that the transmittance of the entire base 1 for ultraviolet rays be from 50% to 90%. Further, the material of the spacer sheets 7 and 8 may be the same as that of the resin sheets 3 and 5 or may be a different material.

Although illustration is omitted, the second resin sheet 5 comprises an adhesive layer (adsorption layer) on a second main surface 5b. It is preferred that the adhesive layer have low viscosity. Here, the term "low viscosity" means that the adhesion strength (peel strength) measured through a 180° peel strength test (conforming to JIS Z 0237:2009) is from 0.01 N/25 mm to 0.1 N/25 mm. Further, it is preferred that the adhesive layer be capable of maintaining low viscosity without a change in adhesion strength due to operating time and thermal load and do not cause an adhesive transfer. As the second resin sheet 5, for example, a self-adhesive film can be used.

It is preferred that the bonding layers 4 and 6 each have a thickness of from 10 μm to 500 μm, more preferably from 25 μm to 100 μm. It is preferred that the bonding layers 4 and 6 each be thin from the viewpoint of improving the flexibility. It is preferred that the thicknesses of the bonding layers 4 and 6 be smaller than the thicknesses of the glass sheet 9 and the resin sheets 3 and 5.

Examples of the material of the bonding layers 4 and include an optically transparent adhesive sheet and a pressure-sensitive adhesive sheet (PSA). As an adhesive component of the bonding layers 4 and 6, an acrylic adhesive, a silicon-based adhesive, an epoxy-based adhesive, or a photocurable adhesive (for example, ultraviolet-ray curable adhesive) can be used. In the case of the ultraviolet-ray curable adhesive, it is preferred that the transmittance for ultraviolet rays (365 nm) after curing be from 70% to 80%. The bonding layers 4 and 6 may each comprise a resin base or comprise no resin base. From the viewpoint of improving the flexibility of the bonding layers 4 and 6 to improve ease of separating the base 1 in a separation step described later, it is preferred that the bonding layers 4 and 6 each be formed of the optically transparent adhesive sheet.

The width-direction dimension of the intermediate sheet 2, that is, the width-direction dimension of the glass sheet 9 and the width-direction dimension of each of the spacer sheets 7 and 8 are smaller than the width-direction dimension of each of the resin sheets 3 and 5. Thus, the resin sheets 3 and 5 protrude from the glass sheet 9 and the spacer sheets 7 and 8 in the width direction. With such configuration, when another member comes into contact with the end surfaces of the base 1 in the width direction, the end surfaces 3d and 5d of the resin sheets 3 and 5 in the width direction preferentially come into contact with the another member. Accordingly, the end surfaces 9d of the glass sheet 9 in the width direction are less liable to come into contact with the another member. Consequently, breakage of the end surfaces 9d of the glass sheet 9 in the width direction can be prevented.

Under the state in which the bending deformation does not occur in the base 1, the first resin sheet 3 is flat in the entire region in the winding direction and in the width direction. Meanwhile, the second resin sheet 5 has step portions 10, which are located at portions protruding from the intermediate sheet 2 in the width direction and extend toward the first resin sheet 3 side. Thus, based on the presence or absence of the step portions 10, front and back surfaces of the base 1 or of the flexible mold to be manufactured with use of the base 1 can easily be distinguished.

The second bonding layer 6 protrudes from the glass sheet 9 in the width direction and is in contact with the first resin sheet 3 on the outer side of the glass sheet 9. As a result, the end surfaces 9d of the glass sheet 9 in the width direction are covered by the second bonding layer 6. With such configuration, the end surfaces 9d of the glass sheet 9 in the width direction are protected by the second bonding layer 6. Thus, the end surfaces 9d of the glass sheet 9 in the width direction are less liable to be broken. Further, in case of breakage, broken pieces of glass are less liable to scatter to the surrounding. In this embodiment, the end surfaces 7d and 8d of the spacer sheets 7 and 8 in the width direction are also covered by the second bonding layer 6.

It is preferred that a protruding amount X of each of the resin sheets 3 and 5 from the glass sheet 9 in the width direction be from 0.2 mm to 100 mm. When the end surfaces 9c of the glass sheet 9 are covered by the second bonding layer 6 as in this embodiment, in order to easily secure the thickness of the bonding layer covering the end surfaces 1, it is more preferred that the protruding amount X be from 2 mm to 100 mm. It is preferred that a protruding amount Y of each of the resin sheets 3 and 5 from the spacer sheets 7 and 8 in the width direction also be from 0.2 mm to 100 mm. When the end surfaces 7d and 8d of the spacer sheets 7 and 8 are covered by the second bonding layer 6 as in this embodiment, in order to easily secure the thickness of the bonding layer covering the end surfaces 7d and 8d, it is more preferred that the protruding amount Y also be from 2 mm to 100 mm.

Although illustration is omitted, it is preferred that the resin sheets 3 and 5 protrude from the second bonding layer 6 in the width direction. With such configuration, the second bonding layer 6 does not protrude toward the outer side of the base 1. Thus, contamination of a surrounding environment with an adhesive can be prevented.

It is preferred that a protruding amount of each of the resin sheets 3 and 5 from the second bonding layer 6 in the width direction be from 0.2 mm to 1 mm. Further, the second bonding layer 6 may protrude from the resin sheets 3 and 5 in the width direction. Further, respective end surfaces of the second bonding layer 6 and the resin sheets 3 and 5 in the width direction may be located on the same plane.

In this embodiment, the base 1 further comprises a first protective film 11 and a second protective film 12. The first protective film 11 is removably affixed to the first main surface 3a of the first resin sheet 3. The second protective film 12 is removably affixed to the second main surface 5b of the second resin sheet 5. With such configuration, damage and adhesion of dirt on the surface of the base 1 can be prevented. Any one or both of the protective films 11 and 12 may be omitted.

Although illustration is omitted, the first protective film 11 comprises a resin base and an adhesive layer (adsorption layer). Examples of the resin base include PET and polyethylene (PE). It is preferred that the resin base have a thickness of from 5 μm to 100 μm. It is preferred that the adhesive layer have low viscosity. It is preferred that the adhesive layer have a thickness of from 1 μm to 50 μm. As the first protective film 11, for example, a self-adhesive film can be used.

The second resin sheet 5 comprises an adhesive layer on the second main surface 5b. Thus, the second protective film 12 may be formed only of a resin base or may comprise a resin base and an adhesive layer (adsorption layer). For example, the thickness, material, and properties of the resin base and/or the adhesive layer may be the same as those of the first protective film 11.

Figure 4:
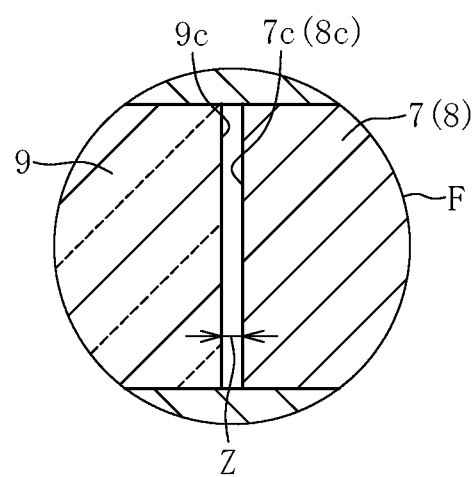
FIG. 4 is an enlarged view of the region F of FIG. 1.

It is preferred that, as illustrated in FIG. 4, the end surfaces 7c and 9c of the first spacer sheet 7 and the glass sheet 9 opposed to each other in the winding direction be apart from each other. Similarly, it is preferred that the end surfaces 8c and 9c of the second spacer sheet 8 and the glass sheet 9 opposed to each other in the winding direction be apart from each other. With such configuration, the end surfaces 9c of the glass sheet 9 in the winding direction are less liable to come into direct contact with the end surfaces 7c and 8c of the spacer sheets 7 and 8 in the winding direction. Consequently, the end surfaces 9c of the glass sheet 9 in the winding direction are less liable to be broken.

It is preferred that a separation distance Z between the end surfaces 7c and 8c of the spacer sheet 7 and the end surfaces 9c of the glass sheet 9 be from 0.2 mm to 2 mm.

A gap defined between the end surfaces 7c and 8c of the spacer sheets 7 and 8 in the winding direction and the end surfaces 9c of the glass sheet 9 in the winding direction may be filled with, for example, an adhesive.

A manufacturing method for a flexible mold 13 using the base 1 having the configuration described above comprises, as illustrated in FIG. 5A to FIG. 5D, an application step, a transfer step, and a separation step. In this embodiment, before the application step, the first protective film 11 is removed from the first resin sheet 3.

Figure 5A:
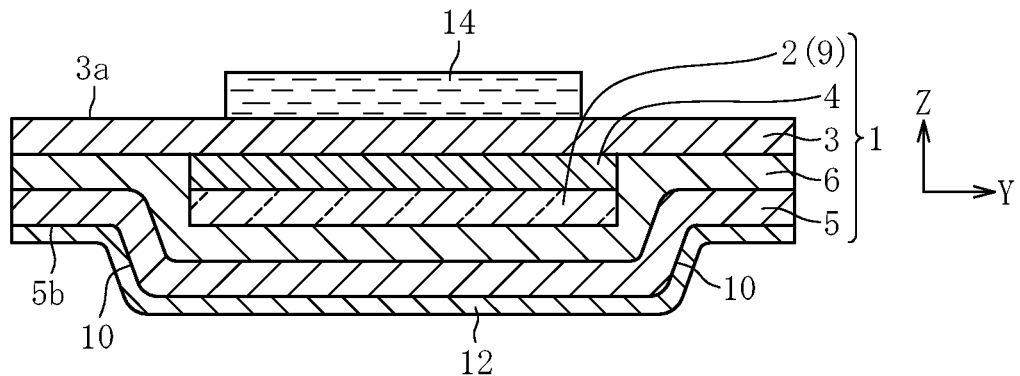
FIG. 5A is a sectional view for illustrating a manufacturing method for a flexible mold according to an embodiment of the present invention.

As illustrated in FIG. 5A, in the application step, a liquid molding material 14 is applied to the first main surface 3a of the first resin sheet 3 included in the base 1. Here, when the molding material 14 is to be applied to the glass, a surface treatment such as a silane coupling treatment is required for securing adhesion of the molding material 14. When the molding material 14 is applied to the first resin sheet 3 as in this embodiment, the adhesion of the molding material 14 can be secured without any special surface treatment.

An application region of the molding material 14 is not particularly limited as long as the application region is located within the first main surface 3a of the first resin sheet 3. In this embodiment, the application region is located within an area of the first main surface 3a in which the first resin sheet 3 and the glass sheet 9 overlap each other. That is, in this embodiment, the molding material 14 is not applied to a portion of the first main surface 3a protruding from the intermediate sheet 2 in the width direction and portions overlapping the spacer sheets 7 and 8. Within the area in which the first resin sheet 3 and the glass sheet 9 overlap each other as described above, the change in dimension of the first resin sheet 3 due to expansion is likely to be regulated by the glass sheet 9. Accordingly, high dimensional stability derived from the glass sheet 9 can easily be maintained even on the first resin sheet 3. Thus, an uneven pattern having high accuracy can be formed in the transfer step.

Any material generally used for an imprint method can be used as the material of the molding material 14, and the material is suitably selected according to a type of the imprint method. In the case of a thermal imprint method, examples of the material of the molding material 14 include a thermoplastic resin and a thermosetting resin. In the case of a photo-imprint method, examples of the material of the molding material 14 include a photo-curing resin. In this embodiment, the photo-imprint method using ultraviolet rays is used as the imprint method, and an ultraviolet-ray curable resin is used as the molding material 14.

An application method for the molding material 14 is not particularly limited, and examples thereof include a die coating method, a roll coating method, a gravure coating method, an ink jet printing method, a spray coating method, a spin coating method, a flow coating method, a blade coating method, and a dip coating method.

In the application step, instead of applying the molding material 14 to the base 1, the molding material 14 may be applied to a master mold 15.

Figure 5B:
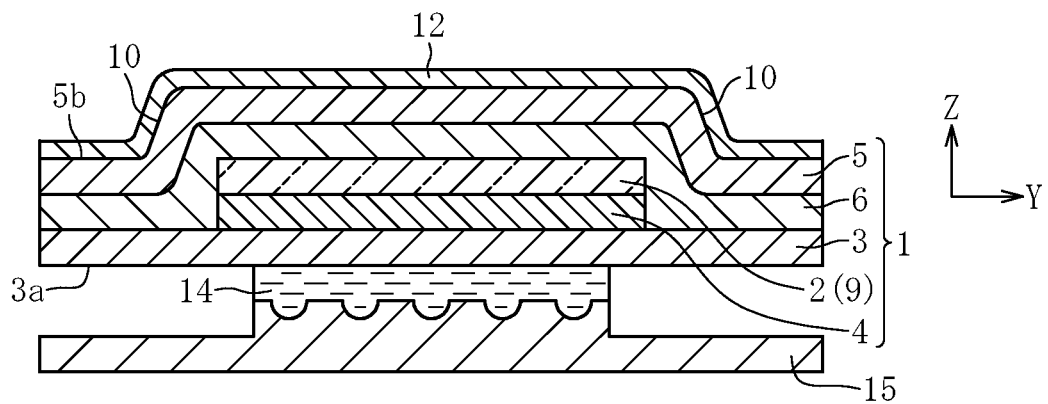
FIG. 5B is a sectional view for illustrating the manufacturing method for a flexible mold according to the embodiment of the present invention.

As illustrated in FIG. 5B, in the transfer step, the molding material 14 is sandwiched between the base 1 and the master mold 15 so that an uneven layer 16 obtained by transferring the recess/projection pattern of the master mold 15 to the molding material 14 is formed on the base 1. The uneven layer 16 is obtained by solidifying the molding material 14 under the state in which the molding material 14 is sandwiched between the base 1 and the master mold 15 (see FIG. 5C). Here, the solidifying includes hardening.

The master mold 15 is obtained through precise formation of an uneven pattern by, for example, NC processing, photolithography, or electron beam lithography. The master mold 15 is formed of, for example, silicon, a silicon oxide film, silica glass, resin, or metal. The master mold 15 has a plate-like shape in this embodiment, but may be in an endless manner, for example, in a form of an endless belt or a roll.

In this embodiment, the photo-imprint method using ultraviolet rays as the light for solidifying the molding material 14 is used. That is, the molding material 14 is solidified by irradiating the molding material 14 with ultraviolet rays. The ultraviolet rays are radiated from the base 1 side. However, when the master mold 15 has ultraviolet-ray transmittance, the ultraviolet rays may be radiated from the master mold 15 side. When the ultraviolet rays are radiated in such a manner, in order to accelerate a solidification reaction, the molding material 14 may be heated.

In the case of using the photo-imprint method, the light to be radiated is suitably changed according to a kind of the molding material 14. For example, visible light or infrared rays may also be used. Further, in the case of using the thermal imprint method, for example, the molding material 14 is solidified by heating the molding material 14 from at least one of the base 1 side and the master mold 15 side.

Figure 5C:
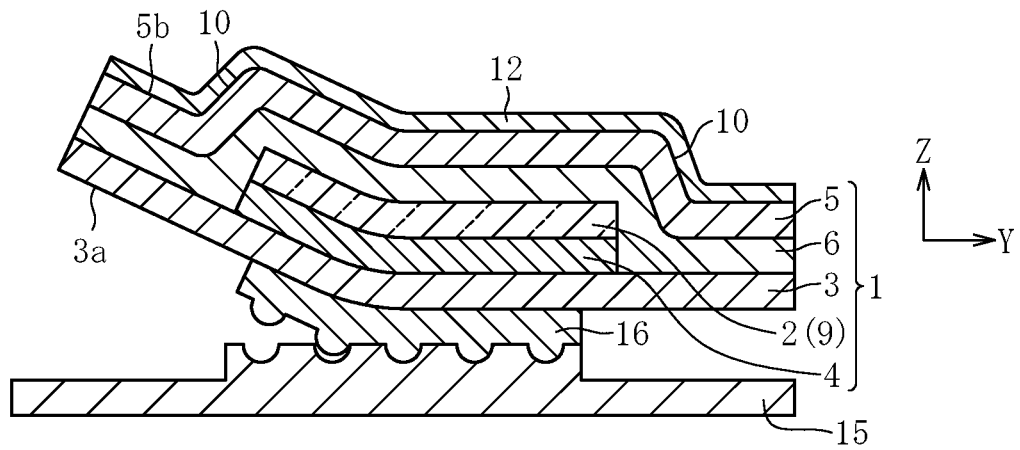
FIG. 5C is a sectional view for illustrating the manufacturing method for a flexible mold according to the embodiment of the present invention.
Figure 5D:
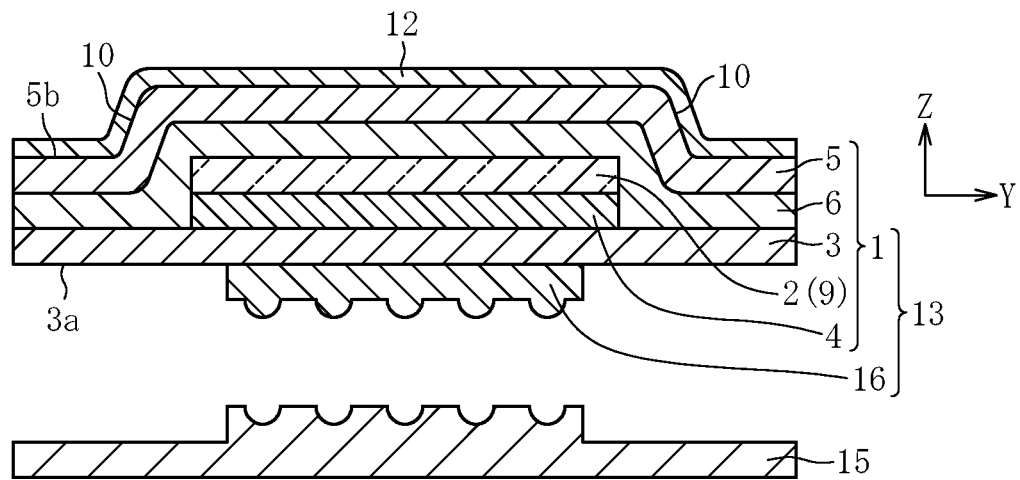
FIG. 5D is a sectional view for illustrating the manufacturing method for a flexible mold according to the embodiment of the present invention.

As illustrated in FIG. 5C and FIG. 5D, in the separation step, the master mold 15 and the uneven layer 16 are separated away from each other. In this embodiment, as illustrated in FIG. 5C, the master mold 15 and the uneven layer 16 are separated away from each other while the base 1 having the uneven layer 16 is partially bent. At this time, it is preferred that the master mold 15 be supported in a flat state without being bent. In FIG. 5C, the base 1 is partially bent in the width direction. However, the base 1 may be partially bent in the winding direction. Further, both the master mold 15 and the base 1 maybe supported in a flat state without being bent.

As illustrated in FIG. 5D, the master mold 15 and the uneven layer 16 are completely separated away from each other so that the flexible mold 13 having the uneven layer 16 formed on the first main surface 3a of the first resin sheet 3 of the base 1 is manufactured.

Figure 6:
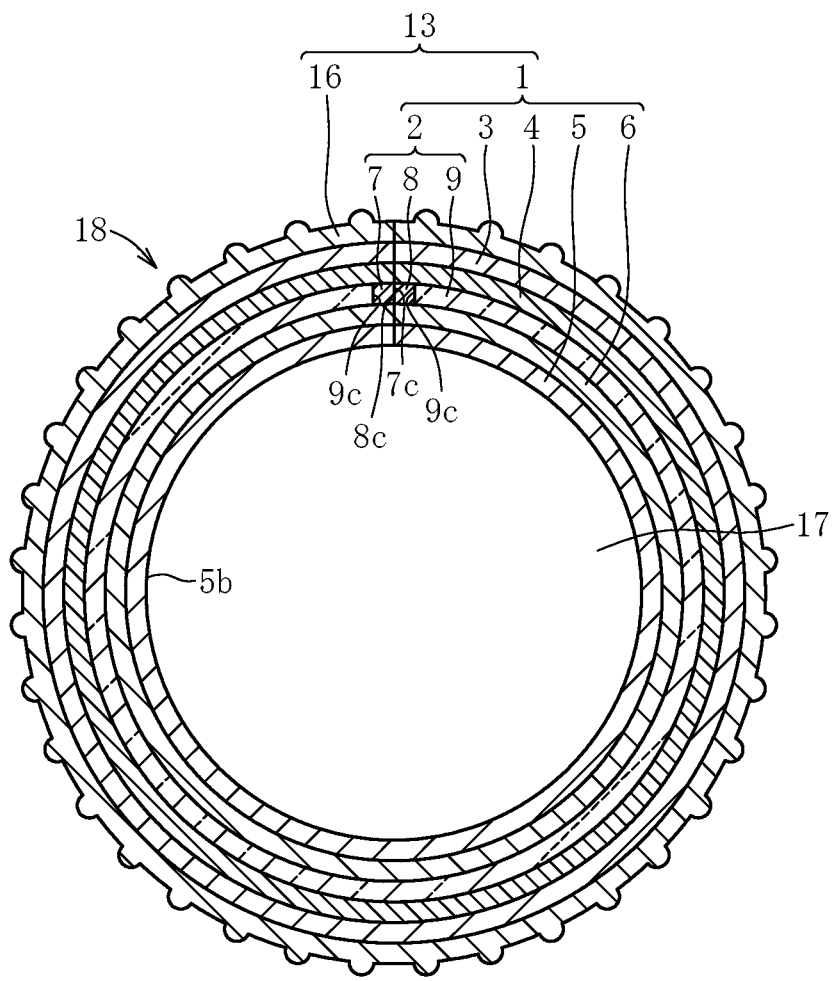
FIG. 6 is a sectional view for illustrating an imprint roll comprising a flexible mold according to the embodiment of the present invention having the structure of being wound in an endless manner.

As illustrated in FIG. 6, the flexible mold 13 having been manufactured is wound in an endless manner around an outer peripheral surface of a roll main body 17 such that the uneven layer 16 is located on the outer side, and is used as an imprint roll 18. Under the state in which the flexible mold 13 is wound in the endless manner in the manner described above, the end surfaces 7c and 8c of the spacer sheets 7 and 8 of the intermediate sheet 2 in the winding direction are brought into abutment against each other, and the end surfaces 9c of the glass sheet 9 in the winding direction do not come into direct contact with each other. The adhesive layer having low viscosity provided on the second main surface 5b of the second resin sheet 5 is affixed to the outer peripheral surface of the roll main body 17, and the flexible mold 13 is held on the roll main body 17. In this embodiment, before the flexible mold 13 is wound around the outer peripheral surface of the roll main body 17, the second protective film 12 is removed from the second resin sheet 5.

With the imprint roll 18 having such configuration, an unnecessary step is not formed in the winding direction (circumferential direction of the roll 18). Thus, the recess/projection pattern can be transferred to a product with high accuracy, or the transfer operation can easily be performed. Further, while the high dimensional stability derived from the glass sheet 9 is secured, the breakage of the glass sheet can also be reduced as much as possible. Further, the flexible mold 13 is held on the roll main body 17 with the adhesive layer having low viscosity. Thus, the flexible mold 13 can easily be replaced when the uneven layer 16 is broken or distorted.

Figure 7:
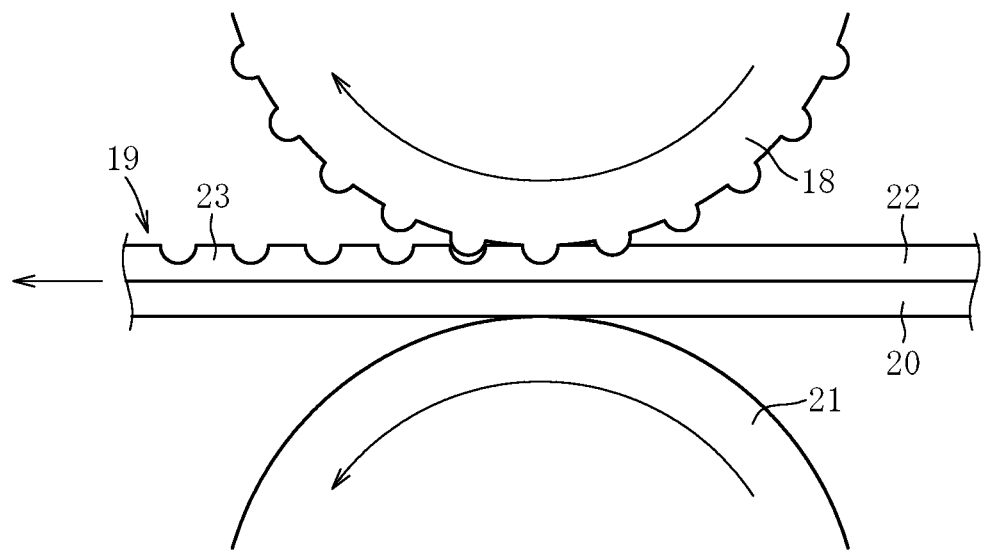
FIG. 7 is a side view for illustrating a manufacturing method for an optical component according to the embodiment of the present invention.

An example of a manufacturing method for an optical component 19 using the flexible mold 13 configured as described above and wound in the endless manner, that is, using the imprint roll 18 is illustrated in FIG. 7. The optical component 19 corresponds to a product.

As illustrated in FIG. 7, according to the manufacturing method, the imprint roll 18 and a backup roll 21 are arranged on a conveyance passage for a substrate 20 in such a manner as to be opposed to each other across the conveyance passage. The imprint roll 18 and the backup roll 21 rotate in a direction of conveying the substrate 20 toward a downstream side.

On an upstream side of the imprint roll 18, a liquid molding material 22 is applied on the substrate 20.

The substrate 20 having the liquid molding material 22 applied thereon passes between the imprint roll 18 and the backup roll 21. Accordingly, after the recess/projection pattern of the imprint roll 18 (flexible mold 13) is transferred to the molding material 22, the molding material 22 is separated away from the imprint roll 18.

The molding material 22 having the recess/projection pattern transferred thereon is solidified through a predetermined solidification treatment determined according to a kind of the material (for example, radiation of ultraviolet rays or heating) so that an uneven layer 23 is formed on the substrate 20. The solidification of the molding material 22 is performed at the position at which the imprint roll 18 and the backup roll 21 are arranged or on a downstream side of such position. As a result, the optical component 19 comprising the substrate 20 having the uneven layer 23 formed thereon is manufactured. The optical component 19 is used for manufacture of, for example, a liquid crystal display, a liquid crystal orientation film, a deflection plate, a micro-lens for an LED, an antireflection film, a diffraction optical element, a single-focus lens, a plasmon filter, or a micro-mirror array.

Examples of the substrate 20 include a resin substrate, a glass substrate, and a composite substrate of those substrates. When an application surface of the substrate 20 is a glass surface, in order to improve adhesion with respect to the molding material 22, it is preferred that the substrate 20 be subjected to a surface treatment such as a silane coupling treatment. The substrate 20 may be supplied intermittently in a form of a sheet substrate, or may be supplied continuously by a roll-to-roll system.

Any material generally used for the imprint method can be used as the molding material 22, and the material may be the same as that of the molding material 14 used for the manufacture of the flexible mold 13, or may be a material of a different kind.

The present invention is not limited to the above-mentioned embodiment. The present invention may be carried out in various modes without departing from the spirit of the present invention.

In the above-mentioned embodiment, description is made of the case in which, in the base 1 for a flexible mold, the width of the intermediate sheet 2 (the width of the glass sheet 9 and the width of each of the spacer sheets 7 and 8) is set to be smaller than the width of each of the first resin sheet 3 and the second resin sheet 5, and the step portions 10 are formed at both end portions of the second resin sheet 5 in the width direction. However, the width of the intermediate sheet 2 may be set to be equal to or larger than the width of each of the first resin sheet 3 and the second resin sheet 5 so that both the first resin sheet 3 and the second resin sheet 5 become flat. In this case, the width of the glass sheet 9 may be set to be equal to or larger than the width of each of the first resin sheet 3 and the second resin sheet 5.

Alternatively, under a state in which the width of the glass sheet 9 is set to be smaller than the width of each of the first resin sheet 3 and the second resin sheet 5, spacer sheets serving as the intermediate sheet 2 and extending in the winding direction may further be arranged on both sides of the glass sheet 9 in the width direction. In this case, the glass sheet may be entirely surrounded by the spacer sheets.

Figure 8:
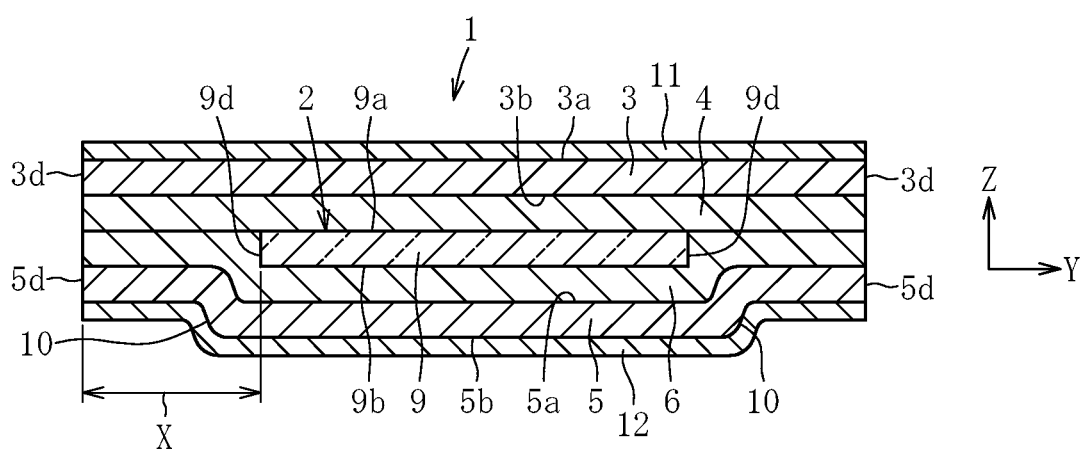
FIG. 8 is a sectional view for illustrating a base for a flexible mold according to a modification example of the embodiment of the present invention.

In the above-mentioned embodiment, description is given of the case in which, for ease of replacement of the flexible mold 13, the adhesive layer having low viscosity is formed on the second main surface 5*b* of the second resin sheet 5. However, when replacement is not required, an adhesive layer having high viscosity may be formed on the second main surface 5*b*. The term "high viscosity" may mean that, for example, the adhesion strength (peel strength) measured through the 180° peel strength test (conforming to JIS Z 0237:2009) is from 50 N/25 mm to 100 N/25 mm. In the above-mentioned embodiment, description is given of the case in which the width-direction dimension of the first bonding layer 4 is approximately equal to the width-direction dimension of the intermediate sheet 2 (glass sheet 9). However, as illustrated in FIG. 8, the width-direction dimension of the first bonding layer 4 may be approximately equal to that of the first resin sheet 3.

REFERENCE SIGNS LIST 1 base
2 intermediate sheet
3 first resin sheet
4 first bonding layer
5 second resin sheet
6 second bonding layer
7 first spacer sheet
8 second spacer sheet
9 glass sheet
10 step portion
11 first protective film
12 second protective film
13 flexible mold
14 molding material
15 master mold
16 recess/projection layer
17 roll main body
18 imprint roll
19 optical component
20 substrate
21 backup roll
22 molding material
23 recess/projection layer

The invention claimed is:

1. A manufacturing method for a flexible mold that is to be wound in an endless manner,
the flexible mold comprising:
    a base; and
    an uneven layer formed on the base,
the manufacturing method comprising:
a transfer step of sandwiching a molding material between the base and a master mold so that the uneven layer obtained by transferring an uneven pattern of the master mold to the molding material is formed on the base,
wherein the base comprises:
    an intermediate sheet;
    a first resin sheet arranged on a first main surface side of the intermediate sheet; and
    a second resin sheet arranged on a second main surface side of the intermediate sheet,
wherein the intermediate sheet comprises:
    a first spacer sheet, which is made of a resin, and is arranged at one end portion of the intermediate sheet in a winding direction of the base;
    a second spacer sheet, which is made of a resin, and is arranged at another end portion of the intermediate sheet in the winding direction; and
    a glass sheet arranged between the first spacer sheet and the second spacer sheet,
wherein each of first main surfaces of the first spacer sheet, the second spacer sheet, and the glass sheet is bonded to the first resin sheet through intermediation of a first bonding layer, and
wherein each of second main surfaces of the first spacer sheet, the second spacer sheet, and the glass sheet is bonded to the second resin sheet through intermediation of a second bonding layer,
wherein, in the transfer step, the uneven layer made of the molding material is formed on the first resin sheet, and
wherein an end surface of the first spacer sheet in the winding direction and an end surface of the glass sheet in the winding direction that are opposed to each other are spaced apart from each other, and an end surface of the second spacer sheet in the winding direction and another end surface of the glass sheet in the winding direction that are opposed to each other are spaced apart from each other.

2. The manufacturing method for a flexible mold according to claim 1, wherein end surfaces of the glass sheet in a width direction orthogonal to the winding direction are covered by at least one of the first bonding layer or the second bonding layer.

3. The manufacturing method for a flexible mold according to claim 2, wherein the first and second resin sheets protrude from the first and second bonding layers in the width direction orthogonal to the winding direction.

4. The manufacturing method for a flexible mold according to claim 3, wherein the second resin sheet, which is to be located on an inner side of the glass sheet when the flexible mold is wound in the endless manner, has low viscosity.

5. The manufacturing method for a flexible mold according to claim 2, wherein the second resin sheet, which is to be located on an inner side of the glass sheet when the flexible mold is wound in the endless manner, has low viscosity.

6. The manufacturing method for a flexible mold according to claim 2, wherein the base further comprises a protective film that is removably laminated on at least one of main surfaces of the base.

7. The manufacturing method for a flexible mold according to claim 1, wherein the first and second resin sheets protrude from the first and second bonding layers in a width direction orthogonal to the winding direction.

8. The manufacturing method for a flexible mold according to claim 7, wherein the second resin sheet, which is to be located on an inner side of the glass sheet when the flexible mold is wound in the endless manner, has low viscosity.

9. The manufacturing method for a flexible mold according to claim 1, wherein the second resin sheet, which is to be located on an inner side of the glass sheet when the flexible mold is wound in the endless manner, has low viscosity.

10. The manufacturing method for a flexible mold according to claim 1, wherein the base further comprises a protective film that is removably laminated on at least one of main surfaces of the base.

11. The manufacturing method for an optical component according to claim 1, wherein
a dimension of the first resin sheet in the winding direction is larger than a dimension of the glass sheet in the winding direction, and
a dimension of the second resin sheet in the winding direction is larger than the dimension of the glass sheet in the winding direction.

12. A manufacturing method for a flexible mold that is to be wound in an endless manner,
the flexible mold comprising:
a base; and
an uneven layer formed on the base,
the manufacturing method comprising:
a transfer step of sandwiching a molding material between the base and a master mold so that the uneven layer obtained by transferring an uneven pattern of the master mold to the molding material is formed on the base,
wherein the base comprises:
an intermediate sheet;
a first resin sheet arranged on a first main surface side of the intermediate sheet; and
a second resin sheet arranged on a second main surface side of the intermediate sheet,
wherein the intermediate sheet comprises:
a first spacer sheet, which is made of a resin, and is arranged at one end portion of the intermediate sheet in a winding direction of the base;
a second spacer sheet, which is made of a resin, and is arranged at another end portion of the intermediate sheet in the winding direction; and
a glass sheet arranged between the first spacer sheet and the second spacer sheet,
wherein each of first main surfaces of the first spacer sheet, the second spacer sheet, and the glass sheet is bonded to the first resin sheet through intermediation of a first bonding layer, and
wherein each of second main surfaces of the first spacer sheet, the second spacer sheet, and the glass sheet is bonded to the second resin sheet through intermediation of a second bonding layer,
wherein, in the transfer step, the uneven layer made of the molding material is formed on the first resin sheet,
wherein a dimension of the first resin sheet in the winding direction is larger than a dimension of the glass sheet in the winding direction, and
wherein a dimension of the second resin sheet in the winding direction is larger than the dimension of the glass sheet in the winding direction.

13. The manufacturing method for a flexible mold according to claim 12, wherein end surfaces of the glass sheet in a width direction orthogonal to the winding direction are covered by at least one of the first bonding layer or the second bonding layer.

14. The manufacturing method for a flexible mold according to claim 13, wherein the first and second resin sheets protrude from the first and second bonding layers in the width direction orthogonal to the winding direction.

15. The manufacturing method for a flexible mold according to claim 13, wherein the second resin sheet, which is to be located on an inner side of the glass sheet when the flexible mold is wound in the endless manner, has low viscosity.

16. The manufacturing method for a flexible mold according to claim 13, wherein the base further comprises a protective film that is removably laminated on at least one of main surfaces of the base.

17. The manufacturing method for a flexible mold according to claim 12, wherein the first and second resin sheets protrude from the first and second bonding layers in a width direction orthogonal to the winding direction.

18. The manufacturing method for a flexible mold according to claim 17, wherein the second resin sheet, which is to be located on an inner side of the glass sheet when the flexible mold is wound in the endless manner, has low viscosity.

19. The manufacturing method for a flexible mold according to claim 17, wherein the base further comprises a protective film that is removably laminated on at least one of main surfaces of the base.

20. The manufacturing method for a flexible mold according to claim 12, wherein the second resin sheet, which is to be located on an inner side of the glass sheet when the flexible mold is wound in the endless manner, has low viscosity.

21. The manufacturing method for a flexible mold according to claim 12, wherein the base further comprises a protective film that is removably laminated on at least one of main surfaces of the base.

22. A base for a flexible mold that is to be wound in an endless manner, the base comprising:
an intermediate sheet;
a first resin sheet arranged on a first main surface side of the intermediate sheet; and
a second resin sheet arranged on a second main surface side of the intermediate sheet,
wherein the intermediate sheet comprises:
a first spacer sheet, which is made of a resin, and is arranged at one end portion of the intermediate sheet in a winding direction of the base;
a second spacer sheet, which is made of a resin, and is arranged at another end portion of the intermediate sheet in the winding direction; and
a glass sheet arranged between the first spacer sheet and the second spacer sheet,
wherein each of first main surfaces of the first spacer sheet, the second spacer sheet, and the glass sheet is bonded to the first resin sheet through intermediation of a first bonding layer,
wherein each of second main surfaces of the first spacer sheet, the second spacer sheet, and the glass sheet is bonded to the second resin sheet through intermediation of a second bonding layer,
wherein a dimension of the first resin sheet in the winding direction is larger than a dimension of the glass sheet in the winding direction, and
wherein a dimension of the second resin sheet in the winding direction is larger than the dimension of the glass sheet in the winding direction.

23. A manufacturing method for an optical component,
the optical component comprising:
a substrate; and
an uneven layer formed on the substrate,
the manufacturing method comprising:
a transfer step of sandwiching a molding material between the substrate and a flexible mold that is wound in an endless manner so that the uneven layer obtained by transferring an uneven pattern of the flexible mold to the molding material is formed on the substrate, wherein the flexible mold comprises:
  a base; and
  a layer having the uneven pattern formed on the base,
wherein the base comprises:
  an intermediate sheet;
  a first resin sheet arranged on a first main surface side of the intermediate sheet; and
  a second resin sheet arranged on a second main surface side of the intermediate sheet,
wherein the intermediate sheet comprises:
  a first spacer sheet, which is made of a resin, and is arranged at one end portion of the intermediate sheet in a winding direction of the base;
  a second spacer sheet, which is made of a resin, and is arranged at another end portion of the intermediate sheet in the winding direction; and
  a glass sheet arranged between the first spacer sheet and the second spacer sheet,
wherein each of first main surfaces of the first spacer sheet, the second spacer sheet, and the glass sheet is bonded to the first resin sheet through intermediation of a first bonding layer,
wherein each of second main surfaces of the first spacer sheet, the second spacer sheet, and the glass sheet is bonded to the second resin sheet through intermediation of a second bonding layer,
wherein a dimension of the first resin sheet in the winding direction is larger than a dimension of the glass sheet in the winding direction, and
wherein a dimension of the second resin sheet in the winding direction is larger than the dimension of the glass sheet in the winding direction.

* * * * *